Feb. 9, 1932.    R. S. MOORE    1,844,172
FEEDER FOR PULVERIZED MATERIAL
Filed March 22, 1928    2 Sheets-Sheet 2

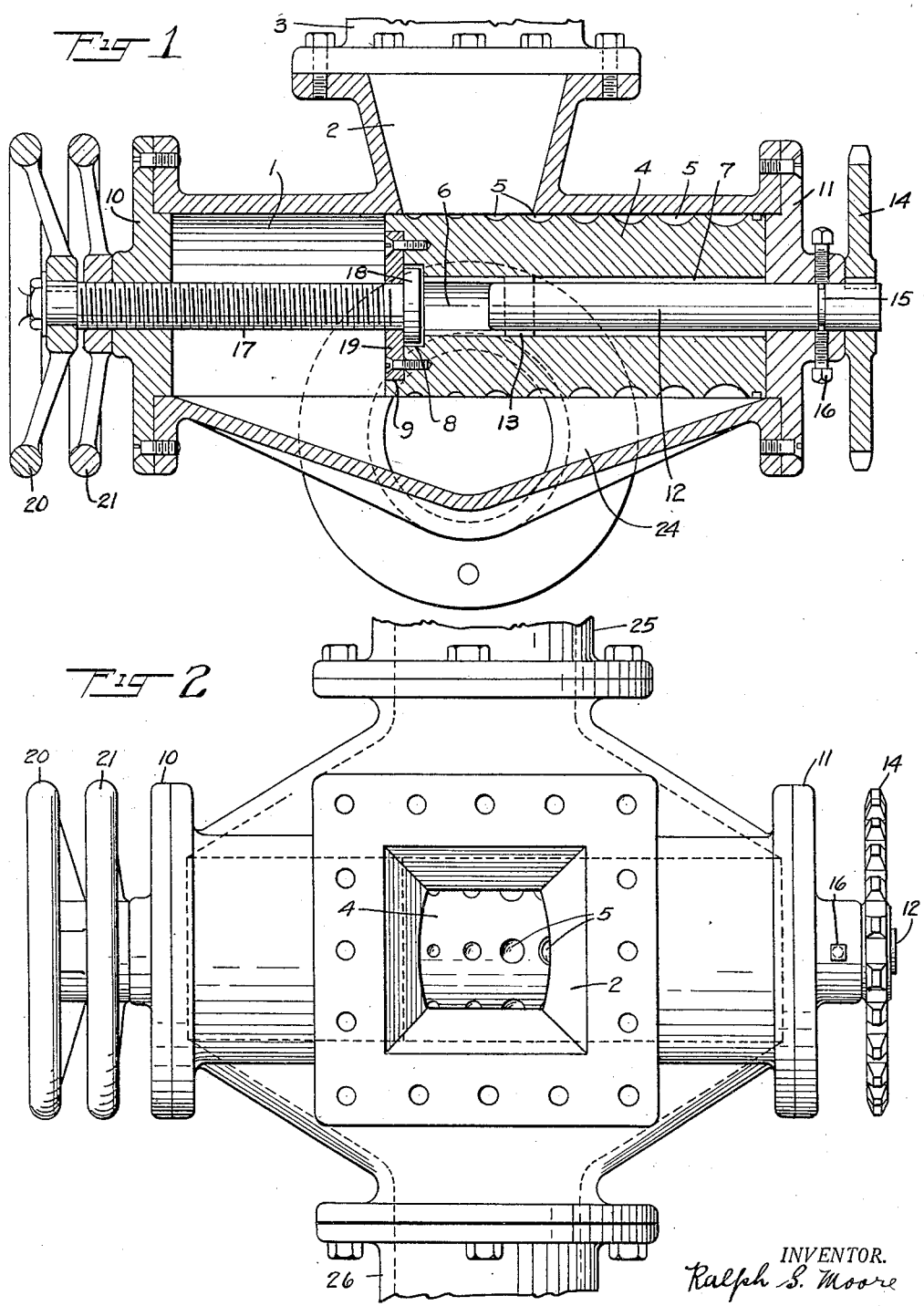

INVENTOR.
Ralph S. Moore
BY Albert M. Austin
ATTORNEY

Patented Feb. 9, 1932

1,844,172

UNITED STATES PATENT OFFICE

RALPH SWITZER MOORE, OF EL PASO, TEXAS, ASSIGNOR TO AMERICAN SMELTING & REFINING COMPANY, OF NEW YORK, N. Y., A CORPORATION OF NEW JERSEY

FEEDER FOR PULVERIZED MATERIAL

Application filed March 22, 1928. Serial No. 263,894.

The invention relates in general to feeders, and more particularly, to a rotary feeder for introducing pulverized materials into furnaces and the like.

The invention contemplates a feeder of the above type for feeding materials into furnaces or other apparatus without permitting free communication of gases between the outside and inside of such apparatus. The feeder may be operated by a source of power at constant speed and suitable devices are provided for accurately controlling the rate of feed irrespective of the speed. The feeder is simple in construction and operation, and so arranged that it is not likely to become clogged and the material is not likely to arch over, no matter how small the rate of feed.

According to one embodiment which the invention may take, the feeder includes a casing having an elongated cylindrical chamber and a feed inlet at its upper end intersecting the cylindrical chamber between its ends. A pair of aligned conduits is provided on the other side of the cylindrical chamber intersecting it. A drum is disposed in the cylindrical chamber, having recesses which may uniformly vary in size from one end of the drum to the other. The drum is adapted to be rotated at constant speed and the rate of feed is controlled by shifting the drum axially to bring different size pockets under the feed inlet. Rotation of the drum carries the material from the feed inlet to the aligned conduits where it may be carried by a draft of air into the apparatus.

Various other features and advantages of the invention will be apparent from the following particular description and from an inspection of the accompanying drawings.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is an elevation in section taken through the axis of the drum;

Fig. 2 is a top plan view;

Figure 3:
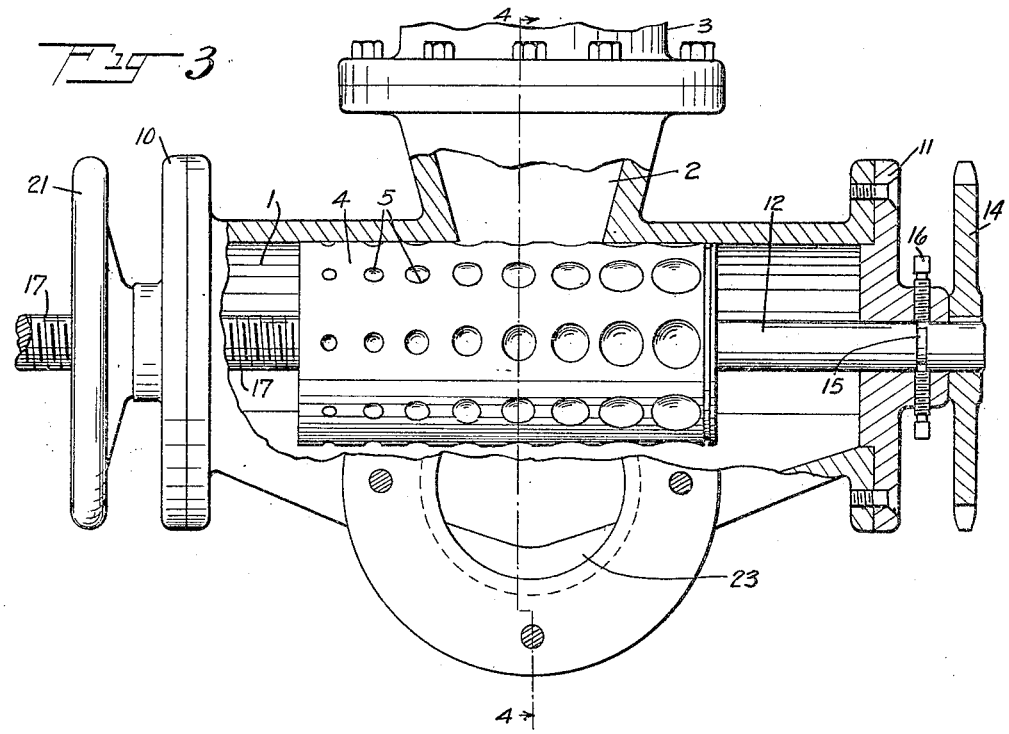
Fig. 3 is an elevation partly in section showing the drum shifted to a different position from that shown in Fig. 1.
Figure 4:
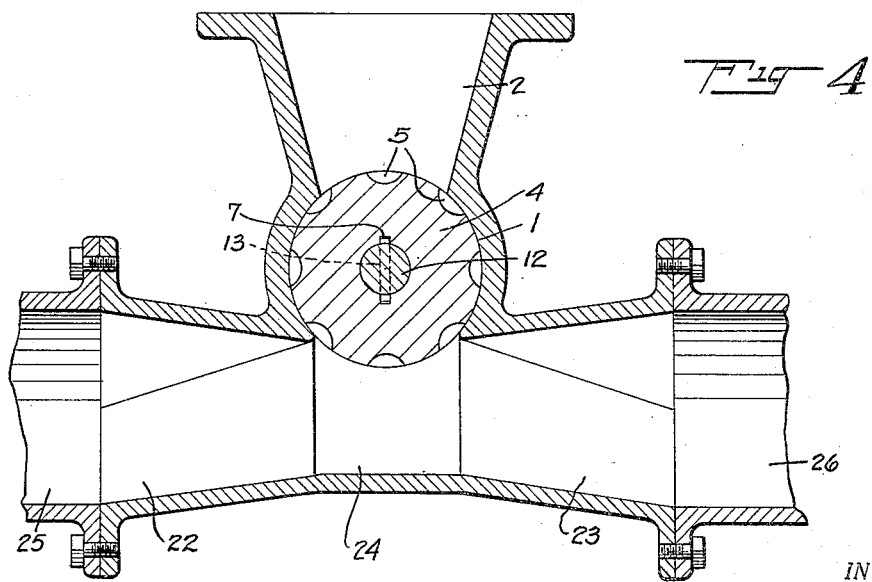
Fig. 4 is a transverse elevational section taken on the line 4—4 of Fig. 3.

In the following description and in the claims, parts will be identified by specific names for convenience, but they are intended to be as generic in their application to similar parts as the art will permit.

Like reference characters denote like parts in the several figures of the drawings.

In the drawings accompanying and forming part of this specification, a practical commercial embodiment of the invention is shown, but as such illustration is primarily for purposes of disclosure, it will be understood that the structure may be modified in various respects without departure from the broad spirit and scope of the invention as hereinafter defined and claimed.

In the particular embodiment shown, the feeder comprises a body having a horizontal long cylindrical chamber 1. Communicating with this chamber midway its length and at the top theerof is a hopper like inlet conduit 2. A feed conduit 3 is connected to the inlet conduit by means of a flange coupling, as shown, for the purpose of conveying the pulverized material from a storage bin (not shown) to the feeder.

Disposed within the cylindrical chamber 1 is a drum 4 having a plurality of circular rows of recesses 5, the recesses varying in size from the smallest at one end to the largest at the other end. The drum 4 is provided with a central opening 6 having feather keyways 7 therein and at one end a stepped opening made up of a smaller recess 8 and a larger recess 9.

Suitably arranged to close the ends of the cylindrical chamber 1 are disk walls 10 and 11 having circular bosses fitting in the chamber and secured to the body of the feeder by flange couplings. The disk wall 11 is provided with an opening through which a drive shaft 12 is passed, the drive shaft having a suitable key member 13 passing therethrough and fitting in the oppositely disposed feather keyways 7. The shaft has a drive sprocket 14 keyed thereto and is provided with an annular groove 15 in which set screws 16 are disposed to fix it axially.

The other disk wall 10 is provided with a threaded opening in which is disposed a threaded adjusting rod 17 having an enlargement 18 at one end seated in the recess 8. A collar or plate 19 is seated in the recess 9 and overlies the enlargement 18, the collar or plate being bolted to the drum 4 by suitable bolts. A hand wheel 20 is keyed to the adjusting rod 17 by which the adjusting rod may be rotated to move the drum 4 axially. A second hand wheel 21 is threaded on the adjusting rod 17 to operate as a lock nut.

Also formed in the body at the lower end thereof and perpendicular to the axis of the shaft is a pair of aligned conduits 22 and 23, the aligned conduits intersecting a chamber 24 which communicates with the cylindrical chamber 1 throughout its length and in which the lower end of the drum 4 is disposed. Suitable outlet and inlet pipes 25 and 26 are connected to the outlet and inlet conduits 22 and 23 by flange couplings. It will be understood that a suitable source of air is supplied to the inlet pipe 26 which blows across the lower face of the drum 4 and carries the pulverized material into the outlet pipe 25 whence it is carried into the furnace or other apparatus. The jet of air aids in keeping the pockets 5 from becoming clogged by blowing the loose material out of them.

In operation, the drum 4 is rotated by the sprocket 14 at constant speed. The inlet conduit or hopper 2 is filled with the material to be fed and the drum is shifted by means of the hand wheel 20 so that the proper size pockets or recesses 5 are under the hopper to feed the desired amount. As the drum 4 rotates, the pockets 5 carry the pulverized material around to the lower chamber 24 where the material drops to the floor of the chamber and is blown out of the pockets by the air draft blowing across the face of the drum. The material is carried by the draft through the outlet pipe 25 to the device it is desired to charge, which may be any sort of a furnace such as a coal furnace, roasting furnace or reverberatory furnace. Any kind of material may be fed, such as pulverized coal, coke, ore, etc. The drum 4 may be rotated so that the lower part thereof travels either against or with the air draft.

Thus a feeder for pulverized and other materials has been provided which is simple in construction and efficient in operation. The device may be driven at constant speed from the same source that a large number of other devices are driven, and the rate of feed may be adjusted by shifting the drum axially irrespective of the speed of rotation thereof. This is a great advantage since in case of a plurality of feeders all driven by the same source of power, each may be controlled independently of the others. The adjustment is simple and easily made. The arrangement is such that parts cannot become clogged and no matter how small the rate of feed, the material cannot arch over or pack so it will not flow by itself. The apparatus is fed by the feeder in controlled amounts and is effectively sealed against the free ingress of air or exit of gases. The initial cost of a feeder is comparatively small and its upkeep is low. The feeder will give long and efficient use and operate successfully for long periods without attention.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. In a feeder for pulverized material, a body having a transverse cylindrical opening with open ends, said body having an opening in its top communicating with said cylindrical opening midway its length, disk walls in said ends, a rotary drum closely fitting in said cylindrical opening, said drum having a plurality of small shallow recesses increasing uniformly in size from one end of the drum to the other, said body having a chamber connecting with said cylindrical opening throughout its length, the entire lower part of said drum being disposed in said chamber, aligned inlet and outlet conduits communicating with said chamber and disposed at right angles to said drum, said drum having an axial opening with a feather keyway, a shaft adapted to be rotated passing through one disk wall and having a key fitting in said keyway, an adjusting screw threaded into the other disk wall and having an abutment on its end, said drum having a recess with overhanging walls inclosing said abutment, means for rotating said screw to shift said drum axially in said cylindrical opening, and a lock wheel on said screw.

2. In a feeder for pulverized material, a body having a transverse cylindrical opening with open ends, said body having an opening in its top communicating with said cylindrical opening midway its length, disk walls in said ends, a rotary drum having a plurality of small shallow recesses increasing uniformly in size from one end of the drum to the other, said body having a chamber connecting with said cylindrical opening throughout its length, the entire lower part of said drum being disposed in said chamber, aligned inlet and outlet conduits communicating with said chamber and having their ends adjacent the chamber coextensive with the latter, the conduits tapering away from the chamber and communicating with inlet and outlet pipes disposed in vertical alignment with the inlet opening at the top of the body, and means for shifting the drum transversely of the body.

In testimony whereof I have hereunto set my hand.

RALPH SWITZER MOORE.